United States Patent [19]

Hamada et al.

[11] Patent Number: 5,356,719
[45] Date of Patent: Oct. 18, 1994

[54] FLUOROSILICONE RELEASE AGENT COMPOSITION

[75] Inventors: Yuji Hamada, Chiba; Keiichi Shimoda, Saitama, both of Japan

[73] Assignee: Dow Corning Toray Silicone Co., Ltd., Tokyo, Japan

[21] Appl. No.: 160,641

[22] Filed: Dec. 2, 1993

[30] Foreign Application Priority Data

Jan. 27, 1993 [JP] Japan .................................. 5-031276

[51] Int. Cl.$^5$ .............................................. B32B 9/04
[52] U.S. Cl. .................................... 428/447; 428/450; 428/451; 528/15; 528/42; 524/731
[58] Field of Search .................... 528/15, 42; 524/731; 428/447, 450, 451

[56] References Cited

U.S. PATENT DOCUMENTS

| | | | |
|---|---|---|---|
| 4,736,048 | 4/1988 | Brown et al. | 556/654 |
| 4,980,440 | 12/1990 | Kendziorski et al. | 528/15 |
| 5,073,422 | 12/1991 | Konno et al. | 528/42 |
| 5,120,810 | 6/1992 | Fujiki et al. | 528/42 |
| 5,254,623 | 10/1993 | Watson | 524/731 |

FOREIGN PATENT DOCUMENTS 59-219366  12/1984  Japan .
63-048901   3/1988  Japan .

*Primary Examiner*—Melvyn I. Marquis
*Attorney, Agent, or Firm*—Alexander Weitz

[57] ABSTRACT

There is disclosed a fluorosilicone composition which, when cured onto a substrate such as paper, provides a surface which readily releases such tacky materials as silicone pressure-sensitive adhesive, said composition comprising (A) 100 parts by weight of an organopolysiloxane that contains in each molecule at least 1 fluorine-containing organic group and at least 2 alkenyl groups;

(B) 0.1 to 40 parts by weight of an organohydrogenpolysiloxane that contains at least 2 silicon-bonded hydrogen atoms in each molecule;

(C) 0.01 to 20 parts by weight of an organopolysiloxane that contains in each molecule at least 1 fluorine-containing organic group, with the proviso that said organopolysiloxane (C) contains neither alkenyl groups nor silicon-bonded hydrogen groups; and (D) a catalytic amount of a hydrosilylation catalyst.

20 Claims, No Drawings

FLUOROSILICONE RELEASE AGENT COMPOSITION

FIELD OF THE INVENTION

The present invention relates to a fluorosilicone release agent composition. More specifically, the present invention relates to a fluorosilicone release agent composition that cures to form a film that has very stable release properties with respect to tacky or sticky substances such as, for example, pressure-sensitive adhesives, particularly silicone-type pressure-sensitive adhesives.

BACKGROUND OF THE INVENTION

When cured on the surface of any of a variety of substrates, e.g., paper, synthetic resin films, synthetic fiber fabrics, etc., a release agent composition produces a cured film that is releasing with respect to tacky or sticky substances such as pressure-sensitive adhesives and the like. Release agent compositions are exemplified by the silicone composition proposed in Japanese Patent Publication Number Sho 63-48901 and the fluorosilicone composition proposed in Japanese Patent Application Laid Open [Kokai or Unexamined] Number Sho 63-320 [U.S. Pat. No. 4,736,048]. The silicone composition proposed in Japanese Patent Publication Number Sho 63-48901 consists of dimethylvinylsiloxy-terminated methylvinylpolysiloxane, trimethylsiloxy-terminated methylhydrogenpolysiloxane, perfluoroalkyl-containing dimethylpolysiloxane, and platinum group metal catalyst. The fluorosilicone composition proposed in Japanese Patent Application Laid Open Number Sho 63-320 consists of platinum group metal catalyst, organohydrogenpolysiloxane, and fluorosilicone that contains both fluoroalkyl and vinyl groups.

The silicone compositions described above cure to form films that have a very stable release performance with respect to organic resin-based tacky or sticky substances. However, they have a poor release performance stability against silicone-type pressure-sensitive adhesives (PSA's) whose base component is an organopolysiloxane such as dimethylpolysiloxane, methylphenylpolysiloxane, etc., and they are therefore not fully satisfactory for some applications.

SUMMARY OF THE INVENTION

The present inventors discovered that a very stable release performance against silicone-type pressure-sensitive adhesives is obtained from the cured film afforded by the cure of a fluorosilicone release agent composition that contains noncrosslinking fluorine-containing organopolysiloxane.

The present invention therefore relates to a fluorosilicone release agent composition that cures to form a film that has very stable release properties with respect to various tacky or sticky substances and most importantly with respect to silicone-type pressure-sensitive adhesives.

The fluorosilicone release agent composition comprises (A) 100 weight parts of a organopolysiloxane that contains in each molecule at least 1 fluorine-containing organic group and at least 2 alkenyl groups, (B) 0.1 to 40 weight parts of an organohydrogenpolysiloxane that contains at least 2 silicon-bonded hydrogen atoms in each molecule, (C) 0.01 to 20 weight parts of an organopolysiloxane that contains in each molecule at least 1 fluorine-containing organic group, with the proviso that organopolysiloxane (C) contains neither alkenyl groups nor silicon-bonded hydrogen; and (D) a hydrosilylation-reaction catalyst in a catalytic quantity.

DETAILED DESCRIPTION OF THE INVENTION

Component (A) is the main or base component in the present invention, and this component is an organopolysiloxane that contains in each molecule at least 1 fluorine-containing organic group and at least 2 alkenyl groups. The fluorine-containing organic group in component (A) is specifically exemplified by groups with the general formula

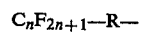

$$C_nF_{2n+1}-R-$$

wherein R is a divalent hydrocarbon groups and n is an integer with a value of 1 to 20; groups with the general formula

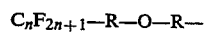

$$C_nF_{2n+1}-R-O-R-$$

wherein R is a divalent hydrocarbon groups and n is an integer with a value of 1 to 20; and groups with the general formula

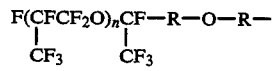

$$F(CFCF_2O)_nCF-R-O-R-$$
$$\quad\quad\quad\quad|\quad\quad\;\;|$$
$$\quad\quad\quad\;\;CF_3\quad\;CF_3$$

wherein R is a divalent hydrocarbon groups and n is an integer with a value of 1 to 20. The divalent hydrocarbon group R in the preceding formulas is specifically exemplified by alkylene groups such as methylene, ethylene, methylmethylene, propylene, and butylene; arylene groups such as phenylene, tolylene, and xylylene; alkylenearylene groups such as methylenephenylene, and ethylenephenylene; and arylenealkylene groups. The alkenyl group present in component (A) is specifically exemplified by vinyl, allyl, butenyl, pentenyl, and hexenyl. No specific restrictions apply to the silicon-bonded organic groups present in component (A) in addition to the alkenyl and fluorine-containing organic groups. Said silicon-bonded organic groups are specifically exemplified by alkyl groups, such as methyl, ethyl, propyl, and butyl; aryl groups such as phenyl, tolyl, and xylyl; and aralkyl groups such as benzyl, and phenethyl. The methyl and phenyl groups are preferred. The organopolysiloxane comprising component (A) may also contain hydroxyl groups and/or alkoxy groups in small quantities.

The molecular structure of organopolysiloxane (A) is not specifically restricted and may be any of, for example, straight-chain, cyclic, resin, and partially branched straight-chain. This component may also be partially cross linked. The degree of polymerization of component (A) is also not specifically restricted, and the organopolysiloxane used as component (A) can range from organopolysiloxane gums to low-viscosity organopolysiloxane fluids. Organopolysiloxanes with viscosities in the range of 100 to 1,000,000 centistokes (25° C.) are preferred from the standpoint of ease of formation of the cured release film.

The organopolysiloxane comprising component (A) is specifically exemplified by dimethylvinylsiloxy-terminated methyl(3,3,3-trifluoropropyl)siloxane-dimethylsiloxane-methylvinyl siloxane copolymers, dimethylvinylsiloxy-terminated methyl(perfluorobutylethyl)siloxane-dimethylsiloxane-methylvinyl siloxane copolymers, dimethylvinylsiloxy-terminated methyl(perfluorohexylethyl)siloxane-dimethylsiloxane-methylvinyl siloxane copolymers, trimethylsiloxy-terminated methyl(perfluorobutylethyl)siloxane-dimethylsiloxane-methylvinyl siloxane copolymers, trimethylsiloxy-terminated methyl(perfluorohexylethyl)siloxane-dimethylsiloxane-methylvinyl siloxane copolymers, dimethylvinylsiloxy-terminated methyl(perfluorobutylethyl)siloxane-dimethylsiloxane copolymers, silanol-terminated methyl(perfluorobutylethyl)siloxane-dimethylsiloxane-methylvinyl siloxane copolymers, and dimethylhexenylsiloxy-terminated methyl(perfluorobutylethyl)siloxane-dimethylsiloxane-methylhexenylsiloxane copolymers.

Component (B) is a crosslinker in the present invention, and this component comprises an organohydrogenpolysiloxane that contains at least 2 silicon-bonded hydrogens in each molecule. The silicon-bonded organic groups present in component (B) in addition to the silicon-bonded hydrogen atoms are specifically exemplified by non-alkenyl monovalent hydrocarbon groups, for example, alkyl groups, such as methyl, ethyl, propyl, butyl, and pentyl; aryl groups such as phenyl, tolyl, and xylyl; and aralkyl groups such as benzyl, and phenethyl. Component (B) may contain fluorine-containing organic groups, these fluorine-containing organic groups being of the type described in connection with component (A).

The organohydrogenpolysiloxane comprising component (B) is specifically exemplified by trimethylsiloxy-terminated dimethylsiloxane-methylhydrogensiloxane copolymers, dimethylhydrogensiloxy-terminated methyl(perfluorobutylethyl)siloxane-methylhydrogensiloxane copolymers, trimethylsiloxy-terminated methyl(perfluorobutylethyl)siloxane-dimethylsiloxane-methylhydrogensiloxane copolymers, trimethylsiloxy-terminated methyl(perfluorohexylethyl)siloxane-methylhydrogensiloxane copolymers, and copolymers composed of the methyl(perfluorobutylethyl)siloxane unit, dimethylhydrogensiloxane unit, and $SiO_2$ unit.

Component (B) is added to the composition of the present invention at 0.1 to 40 weight parts per 100 weight parts of component (A). The bases for this range are as follows: the composition has a very slow rate of cured film formation when component (B) is added at less than 0.1 weight parts per 100 weight parts component (A); at an addition in excess of 40 weight parts, the cured film obtained from the corresponding composition will have a substantially degraded release performance.

The organopolysiloxane comprising component (C) imparts to the cured film afforded by the invention an excellent release performance and an excellent release performance stability with respect to silicone-type pressure-sensitive adhesives based on organopolysiloxane such as dimethylpolysiloxane. Component (C) consists of organopolysiloxane that contains in each molecule at least 1 fluorine-containing organic group but contains neither alkenyl groups nor silicon-bonded hydrogen groups. The fluorine-containing organic group in component (C) is specifically exemplified by the same fluorine-containing groups illustrated above for component (A).

The silicon-bonded organic groups present in component (C) are specifically exemplified by non-alkenyl monovalent hydrocarbon groups, for example, alkyl groups, such as methyl, ethyl, propyl, and butyl; aryl groups such as phenyl, tolyl, and xylyl; and aralkyl groups, such as benzyl, and phenethyl. Component (C) may also contain hydroxyl and/or alkoxy groups in small quantities.

The molecular structure of the organopolysiloxane comprising component (C) is not specifically restricted and may be any of, for example, straight-chain, cyclic, resin, and partially branched straight-chain. This component may also be partially crosslinked. The degree of polymerization of component (C) is also not specifically restricted, and the organopolysiloxane used as component (C) can range from organopolysiloxane gums to low-viscosity organopolysiloxane fluids. Organopolysiloxanes with viscosities in the range of 100 to 1,000,000 centistokes (25° C.) are preferred from the standpoint of ease of formation of the cured release film.

Specific examples of component (C) are trimethylsiloxy-terminated methyl(3,3,3-trifluoropropyl)siloxane-dimethylsiloxane copolymers, trimethylsiloxy-terminated methyl(perfluorobutylethyl)siloxane-dimethylsiloxane copolymers, trimethylsiloxy-terminated methyl(perfluorohexylethyl)siloxane-dimethylsiloxane copolymers, and silanol-terminated methyl(perfluorobutylethyl)siloxane-dimethylsiloxane copolymers.

Component (C) is added to the composition of the present invention at 0.01 to 20 weight parts, preferably at 1 to 10 weight parts, per 100 weight parts component (A). At component (C) additions below 0.01 weight parts per 100 weight parts component (A), the cured film yielded by the corresponding composition has a very reduced release performance and in particular exhibits a diminished release performance stability with respect to silicone-type pressure-sensitive adhesives. At component (C) additions in excess of 20 weight parts per 100 weight parts component (A), the cured film afforded by the corresponding composition suffers from a major decline in strength.

Component (D) is a hydrosilylation-reaction catalyst, and this component functions as a catalyst for crosslinking the organopolysiloxane comprising component (A) and the organohydrogenpolysiloxane comprising component (B). No specific restrictions apply to the hydrosilylation-reaction catalyst comprising component (D), and this component is specifically exemplified by microparticulate platinum adsorbed on a carbon powder carrier, chloroplatinic acid, alcohol-modified chloroplatinic acid, chloroplatinic acid/olefin complexes, chloroplatinic acid/vinylsiloxane coordination compounds, platinum black, palladium catalysts, and rhodium catalysts. Component (D) is added to the composition of the present invention in a catalytic quantity sufficient to facilitate the above mentioned hydrosilylation reaction, this quantity being readily determined by routine experimentation.

The fluorosilicone release agent composition of the present invention is composed of components (A), (B), (C), and (D) as described hereinbefore, and this composition can be prepared by mixing these components to homogeneity. In addition to components (A)–(D), the composition of the present invention may also contain an organic solvent. Organic solvent is a desirable component for the composition of the present invention that functions to increase the storage stability of the composition as well as its coatability with respect to various substrates. Any solvent can be used that can dissolve the invention composition to homogeneity, and operable organic solvents are specifically exemplified by aromatic hydrocarbons, such as trifluorotoluene, and hexafluoroxylene; aliphatic hydrocarbons, such as heptane, hexane, pentane, and isooctane; halogenated hydrocarbons, such as trichloroethylene, and perchloroethylene; and methyl ethyl ketone.

In order to improve the storage stability at room temperature, the composition of the present invention may contain a small quantity of a component that inhibits the catalytic activity of component (D). Such hydrosilylation-reaction inhibitors are exemplified by alkynyl alcohols such as 3-methyl-1-butyn-3-ol, 3,5-dimethyl-1-hexyn-3-ol, and 3-methyl-1-pentyn-3-ol, phenylbutynol, and by 3-methyl-3-penten-1-yne, 3,5-dimethyl-1-hexyn-3-ene, tetra(methylvinylsiloxane) cyclic, and benzotriazole.

Application of the invention composition to the surface of any of various substrates (e.g., paper, synthetic resin films, textiles, etc.) followed by curing, for example, at 120° C. to 150° C. for 20 to 120 seconds, produces a cured film (e.g., a release liner construction) that has a very stable release performance with respect to tacky or sticky substances such as pressure-sensitive adhesives, particularly silicone PSA's. Moreover, the cured film thus obtained is itself strongly adherent to the surface of such substrate.

EXAMPLES

The present invention is explained in greater detail below through working examples. In the examples, parts indicates weight parts and the value reported for the viscosity was measured at 25° C. Molecular weight is number average molecular weight.

Measurement of the Curability

The fluorosilicone release agent composition was coated in the specified quantity on the surface of the specified film or sheet substrate. The specimen was then heated in a hot-air circulation oven at the specified temperature, and the time until formation of the completely cured film was measured.

Measurement of the Peel Resistance

The fluorosilicone release agent composition was applied in the specified quantity on the specified film or sheet substrate. A cured film was prepared by heating at the specified temperature in a hot-air circulation oven for the specified heating time. A commercial dimethylpolysiloxane-based silicone-type pressure-sensitive adhesive (SD4580 from Dow Corning Toray Silicone Company, Limited, adhesive strength for stainless steel sheet=1,400 g/inch) was applied to the surface of the cured film and heated for 3 minutes at 100° C. A polyethylene resin film backing (Lumirar S-10 From Toray Kabushiki Kaisha) was adhered on the treated surface, and the assembly was then aged for the specified time at 25° C. under a load of 20 g/cm$^2$ to give the measurement sample. The test specimen was prepared by cutting the measurement sample to a width of 2.5 cm. Using a tensile tester, the backing film was peeled at an angle of 180° and a peel velocity of 0.3 m/minute, and the force (g) required for peeling was measured.

Residual Adhesion

After measurement of the peel resistance as described above, the test specimen was applied to a stainless steel sheet. The force (g) required to peel this test specimen was again measured using an angle of 180° and a peel velocity of 0.3 m/minute. This force is reported as a percentage of the force required to peel the untreated reference tape.

EXAMPLE 1

The following were dissolved in 994 parts isooctane: 100 parts dimethylvinylsiloxy-terminated methyl(perfluorobutylethyl)siloxane-dimethylsiloxane-methylvinyl siloxane copolymer with a viscosity of 650 poise (methyl(perfluorobutylethyl)siloxane unit=40 mole %, methylvinylsiloxane unit=1.0 mole %, vinyl content=0.2 weight %), 3 parts dimethylhydrogensiloxy-terminated methyl(perfluorobutylethyl)siloxane-dimethylsiloxane-methylhydrogensiloxane copolymer with a viscosity of 20 centipoise (methyl(perfluorobutylethyl)siloxane unit=40 mole %, dimethylsiloxane unit=40 mole %, silicon-bonded hydrogen content=0.3 weight %), 2 parts trimethylsiloxy-terminated methyl(perfluorobutylethyl)siloxane-dimethylsiloxane copolymer with a viscosity of 650 poise (methyl(perfluorobutylethyl)siloxane unit=40 mole %), and 1 part tetra(methylvinylsiloxane) cyclic. A fluorosilicone release agent composition was then prepared by the addition of chloroplatinic acid/divinyltetramethyldisiloxane complex in a quantity sufficient to give 500 ppm as platinum metal. The resulting composition was coated at 0.2 g/m$^2$ on the surface of polyethylene resin film. The curability was measured at 120° C. and 140° C. The peel resistance and residual adhesion were measured on the cured film obtained by heating for 120 seconds at 150° C. These measurement results are reported Table 1.

Comparison Example 1

A fluorosilicone release agent composition was prepared as in Example 1, but in this ease omitting the trimethylsiloxy-terminated methyl(perfluorobutylethyl)siloxane-dimethylsiloxane copolymer with a viscosity of 650 poise (methyl(perfluorobutylethyl)siloxane unit=40 mole %) that was used in Example 1. This composition was subjected to measurement of the curability, peel resistance, and residual adhesion as in Example 1, and these measurement results are also reported in Table 1.

Comparison Example 2

A fluorosilicone release agent composition was prepared as in Example 1, but in this ease adding hydroxyl-terminated dimethylpolysiloxane with a viscosity of 350 centipoise in place of the trimethylsiloxy-terminated methyl(perfluorobutylethyl)siloxane-dimethylsiloxane copolymer with a viscosity of 650 poise (methyl(perfluorobutylethyl)siloxane unit=40 mole %) that was used in Example 1. This composition was subjected to measurement of the curability, peel resistance, and residual adhesion as in Example 1, and these measurement results are also reported in Table 1.

Comparison Example 3

The following were dissolved in 994 parts toluene: 100 parts of a mixture of hydroxyl-terminated dimethylsiloxane-methylvinylsiloxane copolymer (methylvinylsiloxane unit=2.5 mole %, vinyl content=0.1 weight %) and dimethylvinylsiloxy-terminated dimethylpolysiloxane (vinyl content=0.2 weight %), said mixture having a number average molecular weight=400,000 (80 parts hydroxyl-terminated dimethylsiloxane-methylvinylsiloxane copolymer and 20 parts dimethylvinylsiloxy-terminated dimethylpolysiloxane), 2 parts dimethylhydrogensiloxy-terminated methylhydrogenpolysiloxane (silicon-bonded hydrogen content=1.5 weight %) with a viscosity of 20 centipoise, and 1 part tetra(methylvinylsiloxane) cyclic. A silicone release agent composition was then prepared by the addition of chloroplatinic acid/divinyltetramethyldisiloxane complex in a quantity sufficient to give 500 ppm as platinum metal. The resulting composition was coated at 0.2 g/m² on the surface of polyethylene resin film. The curability was measured at 120° C. and 140° C. The peel resistance and residual adhesion were measured on the cured film obtained by heating for 120 seconds at 150° C. These measurement results are also reported in Table 1.

Comparison Example 4

The following were dissolved in 994 parts toluene: 100 parts of a mixture of hydroxyl-terminated dimethylsiloxane-methylvinylsiloxane copolymer (methylvinylsiloxane unit=2.5 mole %, vinyl content: 0.1 weight %) and dimethylvinylsiloxy-terminated dimethylpolysiloxane (vinyl content=0.02 weight %), said mixture having average molecular weight=400,000 (80 parts hydroxyl-terminated dimethylsiloxane-methylvinylsiloxane copolymer and 20 parts dimethylvinylsiloxy-terminated dimethylpolysiloxane ), 2 parts dimethylhydrogensiloxy-terminated methylhydrogenpolysiloxane (silicon-bonded hydrogen content=1.5 weight %) with a viscosity of 20 centipoise, 2 parts trimethylsiloxy-terminated methyl(perfluorobutylethyl)siloxane-dimethylsiloxane copolymer with a viscosity of 650 poise (methyl(perfluorobutylethyl)siloxane unit=40 mole %), and 1 part tetra(methylvinylsiloxane) cyclic. A silicone release agent composition was then prepared by the addition of chloroplatinic acid/divinyltetramethyldisiloxane complex in a quantity sufficient to give 500 ppm as platinum metal. The resulting composition was coated at 0.2 g/m² on the surface of polyethylene resin film. The curability was measured at 120° C. and 140° C. The peel resistance and residual adhesion were measured on the cured film obtained by heating for 120 seconds at 150° C. These measurement results are also reported in Table 1.

TABLE 1

|  | Present Invention Example 1 | Comp. Example 1 | Comp. Example 2 | Comp. Example 3 | Comp. Example 4 |
| --- | --- | --- | --- | --- | --- |
| curability (sec) |  |  |  |  |  |
| 120° C. | 30 | 30 | 30 | 30 | 30 |
| 140° C. | 20 | 20 | 20 | 20 | 20 |
| peel resistance |  |  |  |  |  |

TABLE 1-continued

|  | Present Invention Example 1 | Comp. Example 1 | Comp. Example 2 | Comp. Example 3 | Comp. Example 4 |
| --- | --- | --- | --- | --- | --- |
| (g/2.5 cm) |  |  |  |  |  |
| after 1 day | 10 | 40 | 100 | 500 | 500 |
| after 10 days | 10 | 50 | 100 | 650 | 650 |
| residual adhesion (%) | 98 | 97 | 80 | 70 | 70 |

That which is claimed is:
1. A composition comprising:
(A) 100 parts by weight of an organopolysiloxane that contains in each molecule at least 1fluorine-containing organic group and at least 2 alkenyl groups;
(B) 0.1 to 40 parts by weight of an organohydrogenpolysiloxane that contains at least 2 silicon-bonded hydrogen atoms in each molecule;
(C) 0.01 to 20 parts by weight of an organopolysiloxane that contains in each molecule at least 1 fluorine-containing organic group, with the proviso that said organopolysiloxane (C) contains neither alkenyl groups nor silicon-bonded hydrogen groups; and
(D) a catalytic amount of a hydrosilylation catalyst.
2. The composition according to claim 1, wherein said fluorine-containing organic groups are independently selected from the group consisting of groups having the formula

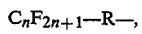
$C_nF_{2n+1}-R-$, groups having the formula

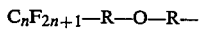
$C_nF_{2n+1}-R-O-R-$ groups with the general formula

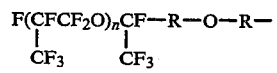
$$F(CFCF_2O)_nCF-R-O-R- \atop \phantom{F(CFCF_2O)_n}CF_3 \phantom{-R-O-}CF_3$$

wherein R is a divalent hydrocarbon group and n is an integer having a value of 1 to 20.
3. The composition according to claim 2, wherein said organopolysiloxane (A) is selected from the group consisting of dimethylvinylsiloxy-terminated methyl(3,3,3-trifluoropropyl)siloxane-dimethylsiloxane-methylvinylsiloxane copolymers, dimethylvinylsiloxy-terminated methyl(perfluorobutylethyl)siloxane-dimethylsiloxane-methylvinylsiloxane copolymers, dimethylvinylsiloxy-terminated methyl(perfluorohexylethyl)siloxane-dimethylsiloxane-methylvinylsiloxane copolymers, trimethylsiloxy-terminated methyl(perfluorobutylethyl)siloxane-dimethylsiloxane-methylvinylsiloxane copolymers, trimethylsiloxy-terminated methyl(perfluorohexylethyl)siloxane-dimethylsiloxane-methylvinylsiloxane copolymers, dimethylvinylsiloxy-terminated methyl(perfluorobutylethyl)siloxane-dimethylsiloxane copolymers, silanol-terminated methyl(-perfluorobutylethyl)siloxane-dimethylsiloxane-methylvinylsiloxane copolymers, and dimethylhexenylsiloxy-terminated methyl(perfluorobutylethyl)siloxane-dimethylsiloxane-methylhexenylsiloxane copolymers.

4. The composition according to claim 2, wherein said organopolysiloxane (C) is selected from the group consisting of trimethylsiloxy-terminated methyl(3,3,3-trifluoropropyl)siloxane-dimethylsiloxane copolymers, trimethylsiloxy-terminated methyl(perfluorobutylethyl)siloxane-dimethylsiloxane copolymers, trimethylsiloxy-terminated methyl(perfluorohexylethyl)siloxane-dimethylsiloxane copolymers, and silanol-terminated methyl(perfluorobutylethyl)siloxane-dimethylsiloxane copolymers.

5. The composition according to claim 3, wherein said organopolysiloxane (C) is selected from the group consisting of trimethylsiloxy-terminated methyl(3,3,3-trifluoropropyl)siloxane-dimethylsiloxane copolymers, trimethylsiloxy-terminated methyl(perfluorobutylethyl)siloxane-dimethylsiloxane copolymers, trimethylsiloxy-terminated methyl(perfluorohexylethyl)siloxane-dimethylsiloxane copolymers, and silanol-terminated methyl(perfluorobutylethyl)siloxane-dimethylsiloxane copolymers.

6. The composition according to claim 1, wherein from 1 to 10 parts by weight of said organopolysiloxane (C) are present for each 100 parts by weight of said organopolysiloxane (A).

7. The composition according to claim 2, wherein from 1 to 10 parts by weight of said organopolysiloxane (C) are present for each 100 parts by weight of said organopolysiloxane (A).

8. The composition according to claim 3, wherein from 1 to 10 parts by weight of said organopolysiloxane (C) are present for each 100 parts by weight of said organopolysiloxane (A).

9. The composition according to claim 4, wherein from 1 to 10 parts by weight of said organopolysiloxane (C) are present for each 100 parts by weight of said organopolysiloxane (A).

10. The composition according to claim 5, wherein from 1 to 10 parts by weight of said organopolysiloxane (C) are present for each 100 parts by weight of said organopolysiloxane (A).

11. The composition according to claim 2, wherein the fluorine-containing organic groups of said organopolysiloxane (A) and of said organopolysiloxane (C) are perfluorobutylethyl radicals.

12. The composition according to claim 11, wherein from 1 to 10 parts by weight of said organopolysiloxane (C) are present for each 100 parts by weight of said organopolysiloxane (A).

13. A release liner construction comprising a substrate coated with the cured composition of claim 1.

14. A release liner construction comprising a substrate coated with the cured composition of claim 2.

15. A release liner construction comprising a substrate coated with the cured composition of claim 5.

16. A release liner construction comprising a substrate coated with the cured composition of claim 6.

17. A release liner construction comprising a substrate coated with the cured composition of claim 7.

18. A release liner construction comprising a substrate coated with the cured composition of claim 10.

19. A release liner construction comprising a substrate coated with the cured composition of claim 11.

20. A release liner construction comprising a substrate coated with the cured composition of claim 12.

* * * * *